United States Patent [19]

Nikles et al.

[11] Patent Number: 4,937,119

[45] Date of Patent: Jun. 26, 1990

[54] TEXTURED ORGANIC OPTICAL DATA STORAGE MEDIA AND METHODS OF PREPARATION

[75] Inventors: David E. Nikles; Harris A. Goldberg, both of Colonia, N.J.

[73] Assignee: Hoechst Celanese Corp., Somerville, N.J.

[21] Appl. No.: 284,887

[22] Filed: Dec. 15, 1988

[51] Int. Cl.$^5$ ............................................... B32B 3/02
[52] U.S. Cl. .................................... 428/64; 478/65; 478/321.5; 478/323; 478/913; 430/311; 430/945; 369/288; 346/766; 346/135.1
[58] Field of Search .................. 430/311, 945; 428/69, 428/65, 321.5, 323, 913; 369/284, 288; 346/766, 135.1

[56] References Cited

U.S. PATENT DOCUMENTS 4,696,856 9/1987 Okada et al. ..................... 428/206
4,740,809 4/1988 Yamamoto et al. ................ 430/138

FOREIGN PATENT DOCUMENTS 280082 12/1987 Japan .
280083 12/1987 Japan .
2198857 6/1988 United Kingdom .

*Primary Examiner*—Patrick Ryan
*Attorney, Agent, or Firm*—Burns, Doane, Swecker & Mathis

[57] ABSTRACT

Provided is an optical data storage medium suitable for use with optical recording and playback apparatus and a method of producing the same. The optical data storage medium according to the present invention comprises a textured surfaced information layer comprised of at least one encapsulated dye. The texturing is accomplished without additional treatment steps in the formation of the surface irregularities. Not only does the optical data storage medium of the present invention provide for a high degree of contrast between the medium and recorded information but also allows for the recording of a higher density of information.

9 Claims, No Drawings

TEXTURED ORGANIC OPTICAL DATA STORAGE MEDIA AND METHODS OF PREPARATION

BACKGROUND OF THE INVENTION

This invention relates to an optical data storage medium and a method of producing the same. More particularly, the present invention relates to an optical data storage medium, preferably in the form of a disk or in tape format, suitable for use with optical recording and playback apparatus, which optical data storage medium comprises a textured surfaced information layer comprised of at least one encapsulated dye.

Various optical recording media and methods for recording information thereon are known in the prior art. For example, the recording of information in the form of deformations or ripples in a thermoplastic film is known, with techniques for achieving such deformations involving the steps of (1) forming a charge pattern on the surface of the thermoplastic film in accordance with the information to be recorded, (2) heating the thermoplastic to its melting point so as to permit the electrostatic forces produced by the charges to form a deformation pattern in the thermoplastic film corresponding to the charge pattern and thus to the information to be recorded, and (3) then cooling the thermoplastic film below its melting point to fix the thus formed deformation pattern in the film. Reading of the plastic film may be accomplished using well-known optical techniques. See, e.g., U.S. Pat. Ser. No. 3,952,146.

Optical recording methods in which light from a laser or other suitable light source is focused upon the surface of a recording medium with sufficient intensity to cause the formation of deformations in the surface material have also been proposed. In such methods, an information representative pattern of deformations, e.g., pits, is formed in the surface of the recording medium by suitably controlling the intensity of the focused light in accordance with the information to be recorded while relative motion is established between the recording medium and the focused light spot.

In recent years, attention has been increasingly paid to the information recording method in which information is written in a thin film of metal or the like formed on a substrate by using a laser ray or beam. According to such a method, the recording of information has been accomplished by forming holes or recesses in the metallic thin film under the action of a thermal energy beam such as a laser beam. See, e.g., U.S. Pat. Ser. No. 4,238,803.

Attention has also been paid to the use of dye layers, polymer layers, or dye/polymer layers as recording layers for optical information media. For example, Spong, U.S. Pat. Ser. No. 4,097,895, describes a recording medium which comprises a light reflecting material, such as aluminum or gold, coated with a light absorbing layer, such as fluorescein, which is operative with an argon laser light source. The thickness of the light absorbing layer is chosen so that the structure has minimum reflectivity. An incident light beam then ablates, vaporizes or melts the light absorbing layer, leaving a hole and exposing the light reflecting layer. After recording at the wavelength of the recording light, maximum contrast between the minimum reflectance of the light absorbing layer and the reflectance of the light reflecting layer exists. In this regard, note also U.S. Pat. Ser. No. 4,219,826.

Carlson, in U.S. Pat. Ser. No. 3,475,760, discloses a system for directly recording information in a thermoplastic film as a deformation by using a high energy laser scanning beam of small diameter.

Slaten, U.S. Pat. Ser. No, 4,310,919, discloses a video disk comprising an information storage layer. The information storage layer is comprised of a plastic such as polymethylmethacrylate, or blends thereof, with other resins. Included among the suitable resins for blending and use in the information storage layer are polyvinyl chloride, polyvinylidine fluoride and styrene copolymers such as styrene acrylonitrile.

Kido et al, U.S. Pat. Ser. No, 4,032,691, discloses a recording material which comprises a support and a heat sensitive recording layer thereon, which heat sensitive layer is thermally deformed, foams, colors, discolors, sublimes, evaporates or becomes transparent, translucent or opaque when exposed to radiation. The heat sensitive recording layer may comprise a metal, dye or synthetic.

Kido et al, U.S. Pat. Ser. No. 4,415,650, discloses optical recording media wherein the recording layer comprises a polymer, a dye, or a combination of both. The recording layer may be coated on a metallic layer supported by a substrate. Polymers usable for the recording layer include thioureas, thiocarbazides, thiocarbanic acid, trizoles and tetrazoles, and polyamides.

Lewis, U.S. Pat. Ser. No. 4,296,158, discloses information carrying media comprised of a substrate having an information bearing layer derived from 15 to 100% by weight of at least one polyacryloyl-containing heterocyclic monomer. Besides the heterocyclic monomer, the information layer can contain up to 85% of an ethylenically unsaturated monomer such as acrylonitrile. The information is encoded on the information carrying layer as depressions, protuberances and/or grooves. The information layer is then exposed to ultraviolet radiation in order to photopolymerize the monomers and harden the layer. The use of polyacrylonitrile in a layer into which information is to be recorded, however, is not disclosed.

Further, there is a recognition in the art of the use of surface structure to increase the contrast between recorded data and the surrounding disc surface.

For example, Craighead et al, U.S. Pat. Ser. No. 4,422,159, discloses the use of a disc which contains preformed column structures to obtain extremely high contrast. Information is written onto the disc by ablating the material from the uppermost surface of the column revealing a reflective medium below. Before treatment the material appeared black when viewed through the microscope and for each pulse a reflective region was produced.

U.S. Pat. Ser. No. 4,084,185, issued to de Lang et al, discloses an optical disc which utilizes diffraction gratings as the source of information, as opposed to a laser ablated "pit." The disc contains alternating concentric tracts of gratings which are angled to diffract light in different directions. This effectively doubles the amount of storage capacity because the two tracks adjacent to the track being read will diffract light away from the detector. In this manner a data track can act as a space or "land" allowing for an "optimum discrimination between the radiation originating from the various types of gratings." The surface diffraction of the disc is not, however, a construction part of the disc which is later ablated to reveal a bright, reflective pit. Instead, it is a structure that is added to the disc simultaneously with the addition of information.

In all of the foregoing techniques, there is involved the formation of a data storage medium and a distinct step for forming the surface irregularities.

Despite all of the techniques used in the optical recording of information and the various materials used in the construction of the information layer of such media, the search for new materials which are useful in the information layer and which provide excellent contrast and sensitivity, and the ability to record a much higher density of information, is continually on-going.

Accordingly, it is a major objective of the present invention to provide a novel optical data storage medium which is stable and on which information can be readily and effectively recorded.

It is further an object of the present invention to provide an optical data storage medium capable of extremely high density data storage.

It is another object of the present invention to provide a recording medium which comprises an information layer which is highly textured.

It is still another object of the present invention to provide a recording medium which comprises an information layer which is highly textured and comprised of at least one microencapsulated dye.

It is still another object of the present invention to provide a recording medium which comprises an information layer which is highly textured and comprised of at least one encapsulated dye.

Yet another object of the subject invention is to provide a novel method for the production of an optical data storage medium as described above which does not require an additional step for the formation of a textured surface.

These and other objects, as well as the scope, nature and utilization of the invention, will be apparent to those skilled in the art from the following description and the appended claims.

SUMMARY OF THE INVENTION

In accordance with the foregoing objectives, provided herewith is such a novel textured optical data storage medium, and a method for producing the same. The optical data storage medium is comprised of a thermally stable substrate and an organic information layer thereon. The information layer has a highly textured surface and is comprised of capsules of at least one encapsulated dye. By at least one encapsulated dye it is understood that the information layer can be comprised of one or a plurality of encapsulated dyes, each of which is responsive to different optical wavelengths. More specifically, the information layer can be subject to optically detectable changes upon the focusing of a laser beam of specific wavelength thereon. In a preferred embodiment the capsules of encapsulated dye exist as microcapsules having an average diameter or relative size of between about 1 micrometer and about 25 micrometers. In a particularly preferred embodiment, the capsules of encapsulated dye exist as nanocapsules having an average diameter or relative size of between about $1 \times 10^{-9}$ and about $1 \times 10^{-6}$ meters.

A method for the production of the aforementioned optical data storage medium comprises the steps of (1) providing a dispersion comprised of capsules of at least one encapsulated dye; and (2) spin coating the dispersion onto a thermally stable substrate to thereby form an encapsulated dye containing layer thereon which has a textured surface. In so doing, an optical data storage medium is produced which has a highly textured surface capable of dispersing light. This texturing is obtained without the need to specially treat either the substrate or the recording layer, but is rather a direct consequence of the use of an encapsulated dye as the recording layer. In a preferred embodiment, the dispersion is comprised of microcapsules of at least one microencapsulated dye, wherein said microcapsules have a relative size of between about 1 micrometer and about 25 micrometers. In a particularly preferred embodiment, the dispersion is comprised of nanocapsules of at least one nanoencapsulated dye, wherein said nanocapsules have a relative size of between about $1 \times 10^{-9}$ and $1 \times 10^{-6}$ meters

DETAILED DESCRIPTION OF THE PREFERRED EMBODIMENTS

An optical data storage medium is a medium on which information can be written with a suitable light means, e.g., a laser, and from which information can be read with a suitable light means. Simplistically, an optical data storage medium in accordance with the present invention may comprise a thermally stable substrate having thereon an organic information layer.

In accordance with the present invention, the organic information layer is comprised of at least one encapsulated dye. The presence of the encapsulated dye provides the information layer with a highly textured surface, which in turn acts as a dispersant, scattering incident light away from a detector. In general, the size of the capsules of dye can be any suitable size for use in optical recording and the reading of optical information. It is preferred, however, that the capsules be microcapsules or nanocapsules. More specifically, in a preferred embodiment of the present invention, the encapsulated dye exists as microcapsules having an average diameter or relative size of between about 1 micrometer and 25 micrometers. In a more preferred embodiment, the encapsulated dye exists as nanocapsules having an average size or relative size of between about $1 \times 10^{-9}$ and $1 \times 10^{-6}$ meters (from one nanometer to one micrometer). By average diameter or relative size it is understood that on the average, the diameter of the particles of encapsulated dye shall be within the ranges defined above.

The encapsulated dye is chosen so that it strongly absorbs at a specific wavelength. The capsule is constructed so that upon exposure to a laser of correct wavelength and intensity, the dye absorbs that laser beam, heats, ruptures the encapsulant and allows the molten dye to flow. The dye then solidifies, forming a highly reflective pool which can be read as a change in the reflectance of a lower intensity read laser. In its simplest form, the optical data storage medium of the present invention involves an optical data storage medium containing only one encapsulated dye. This construction allows for a typical binary information encoding system.

For example, consider the light intensity reflected from the undisturbed textured surface of an optical data storage medium as being the standard or base-line and the amount of light reflected at a data point (a pool of melted and reformed dye) as being either greater or less than that of its surrounding or standard. Assigning symbols to these, the surface or standard intensity can be characterized as zero (0) and the dye spot or data point can be characterized as a plus (+). Therefore, any specific area of the disc can have only one of two encoded states, zero or plus. This is a binary system. When two data points are considered, there are four possible information configurations.

| Data Point A | Data Point B |
|---|---|
| 0 | 0 |
| 0 | + |
| + | 0 |
| + | + |

Thus, the two data points can encode four bits of information.

The present invention is not limited to binary encoding applications. In fact, the present invention provides the ability to encode a great deal more information because it allows for a greater number of encoded states. This is accomplished by the use of a plurality of encapsulated dyes and a plurality of corresponding read and write lasers.

For example, consider an organic information layer in accordance with the present invention comprised of two encapsulated dyes, one of which strongly absorbs at 780 nm and the other of which strongly absorbs at 830 nm. This construction would provide the basis of four encoded states. As before, a specific data point is created by the use of a specific laser of sufficient intensity. For example, if the 780 nm laser was used, it would heat the 780 nm responsive dye and cause to rupture the encapsulant allowing that dye to form a data spot. It is important, however, that the 830 nm responsive dye remain encapsulated while the 780 nm dye is irradiated. Conversely, a data spot can be created by the use of an 830 nm laser without disturbing the 780 nm responsive dye. Alternatively, a data spot could be produced by the simultaneous application of both the 780 and 830 nm lasers. This would cause the rupturing of the microcapsules containing both dyes and the formation of a spot which is a mixture of the two. The four possible encoded states are, therefore: (1) the reflectance from the undisturbed texturized surface; (2) the reflectance from a data spot formed exclusively from dye responsive to laser light of 780 nm; (3) the reflectance of a data spot formed exclusively from dye responsive to laser light of 830 nm; and (4) the reflectance of a data spot resulting from the combination of both dyes.

If it is generally assumed that the number of decimal numbers or bits of information that can be encoded by a given number of data points is given by the equation $N_s = S^k$, where S is the number of encoded states possible for any one data point and k is the number of data points considered, in the present context, since four potential data rendering configurations are possible for any one data spot (S=4) and we are considering only two data points (K=2), 16 bits of information can be encoded ($N_s = 16$). Of course, the present invention is not limited to a two encapsulated dye embodiment, but encompasses the use of a plurality of encapsulated dyes, including both microencapsulated dyes and nanoencapsulated dyes as well as mixtures thereof.

As noted above, the preferred dyes will have very distinct light absorption and reflection characteristics. For example, if the writing of data is to be achieved with a helium/neon laser of 633 nm, then Oil Blue N dye color index 61555, lambda max 637 nm, would be a suitable dye for encapsulation and incorporation in the information layer. If, however, an argon laser is used which provides an output of a wavelength of about 456 nm, an organic dye such as fluorescein which is highly absorptive at the light frequency of the argon laser can be advantageously used. Particularly preferred dyes include naphthalocyanine dyes and phthalocyanine dyes, as well as porphyrin dyes. Most preferred are the naphthalocyanine dyes and phthalocyanine dyes which absorb irradiation and have a lambda max at between about 750 and 850 nm and between about 600 and 700 nm respectively and porphyrin dyes which have a lambda max at between about 400 and 500 nm.

The terms "capsule" and "encapsulated" as used herein refer to both capsules having a discrete capsule wall and capsules formed in a so-called open phase system wherein the internal phase constituents are simply dispersed in a binder and their equivalents. But these terms are not limited thereto. The terms "capsule" and "encapsulated" may include micelles, microemulsions, monolayers, bilayers and vesicles such as those described in *Acc. Chem. Res.* 1984, 17, 3–8 "Polymerized Surfactant Aggregates: Characterization and Utilization", by Janos H. Fendler; *Ind. Eng. Chem. Prod. Res. Dev.*, 1985, 24, 107–113, "Potentials of Polymerized Surfactant Assemblies in Membrane Research", by Janos H. Fendler; *Polymer Preprints* (American Chemical Society, Division of Polymer Chemistry), 1985, Vol. 26(1), "Polymerized Vesicles and Some of their Ghosts", by Steven L. Regen, Jae-Sup Shin and Kazuo Yamaguchi; and *C & E News*, Jan. 2, 1984, "Membrane Mimetic Chemistry" by Janos H. Fendler. Both microcapsules and nanocapsules are similarly defined, except for size.

Microcapsules are filled with an internal phase containing a photosensitive dye composition as previously described and are not visible to the unaided eye, since the mean size of the microcapsules generally ranges from approximately 1–25 microns or micrometers. Nanocapsules are similar, however the mean size of nanocapsules generally ranges from approximately $1 \times 10^{-9}$ to about $1 \times 10^{-6}$ meters.

Dyes used in the present invention may be either hydrophilic or hydrophobic. Consequently, the types of encapsulant and the methods of forming capsules according to the present invention contemplates both circumstances. If, for example, a hydrophobic dye is to be used, capsules may be prepared by: (1) preparing a partially condensed, aqueous thermosetting resin syrup; (2) emulsifying a water-immiscible (hydrophobic) dye in an aqueous colloidal solution of an amphophilic emulsifying agent; and (3) slowly admixing the resin syrup and the emulsion under conditions of brisk agitation to precipitate the resin and encapsulate minute liquid emulsion droplets as described in *Vassiliades*, U.S. Pat. Ser. No. 3,993,831, which is hereby incorporated by reference.

The admixing causes the condensation product to separate from the aqueous medium in solid particle form as a precipitate about a nucleus of oil in water upon dilution with the water of the emulsion. The dilution takes place slowly and under conditions of brisk agitation.

Among the thermosetting resins which can be used is that broad class of compositions defined as partially condensed formaldehyde condensation products. The term "partially condensed" as employed herein is intended to include resins not having reached the infusible or insoluble stage, e.g., B-stage resins.

Exemplary of suitable resins are the condensation reaction products of formaldehyde with phenols, such as, hydroxybenzene (phenol), m-cresol and 3,5-xylenol; carbamides, such as, urea; trazines, such as melamine; amino and amido compounds, such as, aniline, p-toluenesulfonamide, ethyleneurea and guanidine; ketones, such as acetone and cyclohexanone; aromatic hydrocarbons, such as, naphthalene; and heterocyclic compounds, such as thiophene. Under the influence of heat, these resins change irreversibly from a fusible and/or soluble material into an infusible and insoluble material.

The preferred formaldehyde condensation products are partially-condensed melamine-formaldehyde, phenol-formaldehyde and urea-formaldehyde resins. The B-stage melamine and urea-formaldehyde resins are especially preferred.

These partially condensed resins can be prepared easily according to conventional practices. For example, a melamine-formaldehyde partial condensate or syrup, which is used in the examples hereinafter presented, is prepared by refluxing 125 grams of melamine in 184 milliliters of formalin (37 percent by weight formaldehyde) neutralized to a pH of 8 with sodium carbonate. The mole ratio of formaldehyde to melamine in this reaction mixture is 2.3 to 1. The reaction continues for about 1 to 1½ hours at a temperature between 92° and 96° C. or until 1 volume of the condensate becomes turbid when diluted with 2 to 10 volumes of water. The condensate can be used immediately or can be stored for later use by adding a small amount, about 6 to 15 percent by weight, of methanol to the condensate. The methanol prevents any further rapid condensation of the resin solution upon standing and can be evaporated from the syrup either prior to or during the admixing operation.

On the other hand, if a hydrophilic dye is used, capsules may be prepared by the production of small or minute capsules constituted by a skin or thin wall of polymeric material, e.g., polyurea, polyamide, polysulfonamide, polyester, polycarbonate or polyurethane. This involves first providing an organic liquid (continuous phase liquid) containing an oil soluble alkylated polyvinylpyrrolidone emulsifier. A discontinuous (aqueous) phase liquid containing a water-soluble material, which is the material to be encapsulated, plus a first shell wall component, is dispersed in the continuous phase liquid to form a water-in-oil emulsion. The second shell wall component is added to the water-in-oil emulsion whereupon the first shell wall component reacts with the second shell wall component to form a solid polymeric shell wall about the material to be encapsulated. The capsules formed may be directly used as in the form of an organic suspension, i.e., a suspension of capsules in the organic liquid.

Another technique, but one which is applicable to the encapsulation of either hydrophobic or hydrophilic dyes, is generally known as coacervation. Coacervation is the term applied to the ability of a number of aqueous solutions of colloids to separate into two liquid layers, one rich in colloid solute and the other poor in colloid solute. Factors which influence this liquid-liquid phase separation are: (a) the colloid concentration, (b) the solvent of the system, (c) the temperature, (d) the addition of another polyelectrolyte, and (e) the addition of a simple electrolyte to the solution.

A unique property of coacervation systems is the fact that the solvent components of the two phases are the same chemical species. This is a major distinguishing characteristic of coacervates as compared to two phase systems involving two immiscible liquids. Thus, a colloidal solute particle migrating across the interface of a two-phase coacervate system finds itself in essentially the same environment on either side of the interface. From the viewpoint of composition, the difference between the two phases is a difference in concentration of solute species. Structurally, the two phases differ in that the colloidal solute of the colloid-poor phase is randomly oriented and the colloidal solute of the coacervate or colloid-rich phase shows a great deal of order. In all cases where coacervation has been observed, the solute species are geometrically anisotropic particles.

Coacervation can be of two general types. The first is called "simple" or "salt" coacervation where liquid phase separation occurs by the addition of a simple electrolyte to a colloidal solution. The second is termed "complex" coacervation where phase separation occurs by the addition of a second colloidal species to a first colloidal solution, the particles of the two dispersed colloids being oppositely charged. Generally, materials capable of exhibiting an electric charge in solution (i.e., materials which possess an ionizable group) are coacervatable. Such materials include natural and synthetic macromolecular species such as gelatin, acacia, tragacanth, styrenemaleic anhydride copolymers, methyl vinyl ether-maleic anhydride copolymers, polymethacrylic acid, and the like.

With both simple and complex coacervate systems, a necessary precondition for coacervation is the reduction of the charge density of the colloidal species. In the case of simple coacervation, this reduction of the charge density along with partial desolvation of the colloidal species is similar to that preceding the flocculation or precipitation of a colloid with the addition of a simple electrolyte since it is known that the addition of more electrolyte to a simple coacervate leads to a shrinking of the colloidal species. This same reduction of charge density along with partial desolvation of the colloidal species which precedes the precipitation of two oppositely charged colloids from solution may also be regarded to be the cause for the phase separation in a complex coacervate system. However, while the reduction of the charge density is a necessary precondition for coacervation, it is oftentimes not sufficient for coacervation. In other words, the reduction of the charge density on the colloidal particles must alter or modify the solute-solute interactions to such an extent that the colloidal particles will tend to aggregate and form a distinct, continuous liquid phase rather than a flocculent or a solid phase. This tendency is attributable to both coulombic and long-range Van der Waal's interactions of large aggregates in solution. Thus, in both simple and complex coacervation, two-solution phase formation begins with the colloidal species aggregating to form submicroscopic clusters, with these clusters coalescing to form microscopic droplets. Further coalescence produces macroscopic droplets which tend to separate into a continuous phase. This phase appears as a top or bottom layer depending upon the relative densities of the two layers.

If, prior to the initiation of coacervation, an oil-in-water emulsion comprising oil, water and an emulsifying or thickening agent such as carboxymethylcellulose or gum arabic is dispersed as minute droplets in an aqueous solution or sol of an encapsulating colloidal material, and then, a simple electrolyte, such as sodium sulfate, or another, oppositely charged colloidal species is added to induce coacervation, the encapsulating colloidal material forms around each emulsion droplet, thus investing each of said droplets in a liquid coating of the coacervated colloid. The liquid coatings which surround the emulsion droplets must thereafter be hardened in order to produce recoverable solid-walled capsules having structural integrity.

Additional methods of forming capsules, particularly microcapsules, and materials useful in encapsulation are discussed in U.S. Pat. Ser. Nos. 3,864,275; 4,211,668; 4,218,409; 4,073,833; and 4,307,169.

Nanoencapsulation may be accomplished in a number of methods, one of which is disclosed in *Microencapsulation*, edited by J.R. Nixon of Chelsea College, University of London, London, England and published by Marcel Dekker, Inc., copyright 1976. More specifically, chapter one of *Microencapsulation*, which is entitled "Microencapsulation by Coacervating, Spray Encapsulation and Nanoencapsulation" by P. Speiser, discloses, at page 6, the manufacture and morphology of ultrafine compartments or nanocapsules. According to Speiser the basic principles of manufacturing nanocapsules are as follows. An aqueous solute solution (the solute being that which is to be encapsulated) is first solubilized in a weakly polar vehicle. Micelles of water are obtained with the solute in an organic outer phase. Then an amphiphilic monomer is added to the lipophilic external phase. These film-forming precursors are next enriched at the border surface and form a mixed micelle. Then the monomers are polymerized with the aid of suitable procedures such as ultraviolet or gamma radiation, heat and chemical agents. This produces solidified, hardened micelles with the solute molecules containing therein.

An aqueous dispersion of nanocapsules may then be produced by replacing the outer lipophilic vehicle with water. At the same time the tensides and hydrophilic ballast materials are washed out. Finally, an ultrafine suspension of water in water droplets is obtained. The internal water phase is so small that the suspension cannot be recognized with the eye or with the microscope. This suspension looks like a clear aqueous solution with a light opalescent, Tyndall effect. By selecting the monomers and network agents and other auxiliary materials, it is possible to get tailor-made capsules between 80 and 250 nanometers.

In another embodiment the ability of the monomers and their derivatives to copolymerize with unsaturated compounds permits the manufacturing of various coats with a three-dimensional network containing narrow or wide pore openings. By increasing the amount of netting agent and decreasing the amount of monomer we can manipulate the pore opening of the nanocapsules. This pore diameter can be varied between 2 nanometers and 5 nanometers or even higher.

The substrate is used to add dimensional stability and support to the organic information layer. The substrate may be optically featureless or may contain preformatting information (e.g., tracking grooves and/or encoded information in the form of readable marks). However, it is preferred that the substrate have a surface of suitable smoothness. The material of which the substrate is comprised is generally a material exhibiting good mechanical strength and good structural integrity against warping. Examples of suitable materials include aluminum, glass, reinforced glass, ceramics, polymethylmethacrylates, polyacrylates, polycarbonates, phenolic resins, epoxy resins, polyesters, polyimides, polyether sulfones, polyether ketones, polyolefins, polyphenylene sulfide and nylon. A preferred material is polycarbonate.

The shape and size of the substrate, and hence the organic information layer, can vary depending upon the application. The shape and format, for example, may be a disc, tape, belt or drum. A disc shape or tape format is most preferred. Or, two substrates, having the information layer on either side can be combined allowing the sides having the recording layers to face each other at a constant distance, the combined substrate being sealed to prevent dust, contamination and scratches.

The medium of this invention may also have an undercoating layer such as a metal reflective layer or layer of various resins on the substrate if necessary, with the recording layer being coated over it. In addition, various thermoplastic resins, thermosetting resins, UV or electron beam cured resins, may be used as an undercoating material. Furthermore, it may be advantageous to coat the organic information layer with some sort of protective layer such as those known in the art. This will protect the recording layer from dirt, dust, scratches or abrasion.

In forming an optical data storage medium in accordance with the present invention, a dispersion of encapsulated dye is provided. This dispersion can be either purchased or prepared by one of the various methods previously described. Next, the dispersion of encapsulated dye is spin coated onto a substrate, such that it forms a highly textured information layer.

Next, the dispersant is allowed to dry or evaporate and the information layer is allowed to set.

Optionally, a small amount of binder material, for example hydroxy ethyl cellulose, may be added to the microcapsule dispersion prior to spin coating.

The principles, preferred embodiments and modes of operation of the present invention have been described in the foregoing specification. The invention which is intended to be protected herein, however, is not to be construed as limited to the particular embodiments disclosed, since these are to be regarded as illustrative rather than restrictive. Variations and changes may be made by others without departing from the spirit and scope of the invention.

What is claimed is:

1. An optical data storage medium comprised of a substrate and an organic information layer, wherein said information layer has a textured surface and is capable of a plurality of encoded states, said information layer comprising microcapsules of a plurality of microencapsulated dyes selected from the group consisting of naphthalocyanine, phthalocyanine and porphyrin dyes, and with each of the plurality of microencapsulated dyes have a lambda max at a different wavelength.

2. The optical data storage medium of claim 1, wherein at least one of said plurality of microencapsulated dyes has a lambda max between 750 and 850 nm.

3. The optical data storage medium of claim 1, wherein at least one of said plurality of microencapsulated dyes has a lambda max of between 600 and 700 nm.

4. The optical data storage of claim 1, wherein at least one of said plurality of microencapsulated dyes has a lambda max of between 400 and 500 nm.

5. An optical data storage medium comprised of a substrate and an organic information layer, wherein said information layer has a textured surface and is capable of a plurality of encoded states, said information layer comprising nanocapsules having a relative size of between $1\times10^{-9}$ and $1\times10^{-6}$ meters, with the nanocapsules containing a plurality of encapsulated dyes selected from the group consisting of naphthalocyanine, phthalocyanine and porphyrin dyes, and with each of the plurality of encapsulated dyes having a lambda max at a different wavelength.

6. The optical data storage medium of claim 5, wherein at least one of said plurality of encapsulated dyes has a lambda max of between 750 and 850 nm.

7. The optical data storage medium of claim 5, wherein at least one of said plurality of encapsulated dyes has a lambda max of between 600 and 700 nm.

8. The optical data storage medium of claim 5, wherein at least one of said plurality of encapsulated dyes has a lambda max of between 400 and 500 nm.

9. The optical data storage medium of claim 5, wherein the information layer further comprises microcapsules of microencapsulated dyes selected from the group consisting of naphthalocyanine, phthalocyanine and porphyrin dyes.

* * * * *